Feb. 8, 1966 J. KONIJNENBERG ETAL 3,234,414
MINIATURE ELECTRIC MOTOR
Filed March 19, 1963

INVENTORS
JOHAN KONIJNENBERG
HIDDE VAN DER BIJL
BY
AGENT

United States Patent Office 3,234,414
Patented Feb. 8, 1966

3,234,414
MINIATURE ELECTRIC MOTOR
Johan Konijnenberg and Hidde van der Bijl, Drachten, Netherlands, assignors to North American Philips Company, Inc., New York, N.Y., a corporation of Delaware
Filed Mar. 19, 1963, Ser. No. 266,260
Claims priority, application Netherlands, Mar. 26, 1962, 276,428
4 Claims. (Cl. 310—47)

This invention relates to small electric motors of low power, particularly useful for articles of domestic use, dry-shaving apparatus and the like, and its object is to simplify and make the structure and the assembly of such machines less expensive.

In order that the invention may be readily carried into effect, it will now be described in detail, by way of example, with reference to the accompanying diagrammatic drawing, in which.

Figure 1A:
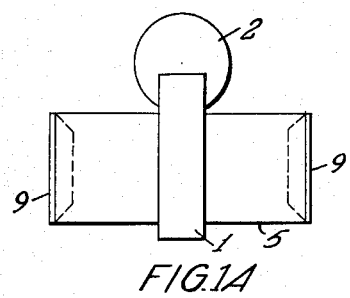
FIG. 1A is a side elevation of FIG. 1 with both shields and bearing carriers in place.
Figure 1:
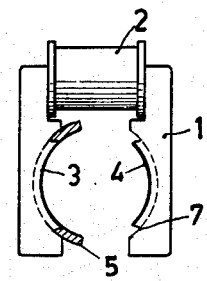
FIG. 1 is an end elevational view of a stator with two pole-pieces for an electric motor having a single shield shown in section.
Figure 4:
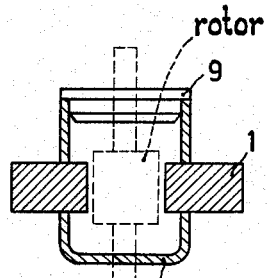
FIG. 4 shows the cylindrical shield of FIG. 3 but provided with a base or bottom wall and with a bearing carrier mounted in place.

Referring now to FIG. 1, the reference numeral 1 indicates a stator body having a winding 2 and pole-pieces 3 and 4. The pole-piece 3 is shown with a shield 5 in place and pole-piece 4 is without a shield. A shield 5 best seen in FIG. 2 has a rectangular aperture 6 and is made of resilient material so that it can be bent into a slightly curved shape and attached onto a pole-piece by sliding the pole face through aperture 6. The faces of each pole-piece is bevelled as at 7 and the corresponding edges 8 of the aperture 6 in the shield 5 are bevelled so that, after placing the shield on the stator pole, a dovetail-like connection between the pole-piece and the shield is established. The rotor shaft is journalled in bearing carriers 9 in the form of a stepped disc as shown in FIG. 4. The bearing carriers 9 are slid, one on each end and in between the stator shields 5 as indicated in FIG. 1A, whereby the structure of the stator is completed. With a suitable choice of the various dimensions of the bearing carriers they are friction filled or clamped between the stator shields and the air-gap of the rotor relative to the shields is fully determined. Furthermore it is not necessary to provide self-adjusting bearings in the bearing carriers.

Figure 3:
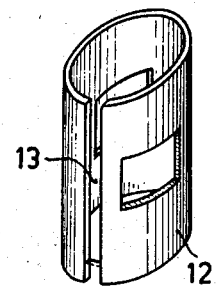
FIG. 3 shows a cylindrical shield of resilient material.
Figure 5:
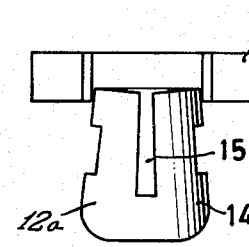
FIG. 5 shows the manner of introducing the cylindrical shield of FIG. 4, but without a bearing carrier, and into assembly with the stator of FIG. 1.
Figure 7:
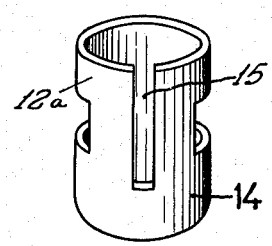
FIG. 7 shows a perspective view of a shield.

As an alternative, the two shields 5 may be united into a single sleeve shield 12 as shown in FIG. 3, which has an axial slot 13 and may be introduced into the stator 1 by a simple deformation. It is also possible to provide a cup-like shield 12a with a closed end 14, as shown in FIGS. 4, 5 and 7. This base may then serve as a bearing carrier at one end so that only one bearing carrier 9 only is required at the other end (FIG. 4). In this case the axial slot 15 extends through only part of the length of the sleeve, as shown in FIGS. 5 and 7. It has been found that the shield 12a may readily be placed in position by compression in a direction at right angles to the gap adjacent the open end of said sleeve.

Figure 2:
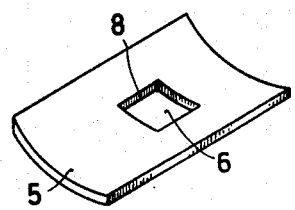
FIG. 2 shows a perspective of a metal shield of resilient material.
Figure 6:
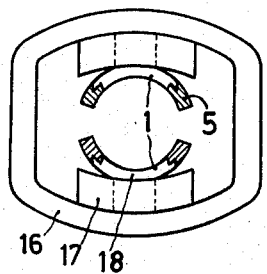
FIG. 6 shows a different stator structure with the shields in place.

A variation of stator 16 is shown in FIG. 6 in which permanent magnets 17 carry pole-pieces 18, may be provided with shields of the type shown in FIG. 2 or a shield of the type seen in FIGS. 3 or 7. In all these cases a stator is obtained which may be readily assembled, while accurate tolerances need not be adhered to due to the great flexibility of the shields 12 and 12a and an air-gap between the rotor and the pole shields may thus be obtained which has a uniform dimension.

What is claimed is:

1. A miniature electric motor having a rotor and rotor shaft projecting from each end thereof, comprising a generally U-shaped stator member defining a pair of opposite pole-pieces, each said pole-piece having a pair of bevelled surfaces; elongated shield means of resilient metal having a radius of curvature substantially equal to the radius of curvature of the rotor for said rotor and an effective diameter greater than the diameter of said rotor, an aperture in each said shield means having a pair of bevelled surfaces corresponding with the bevelled surfaces of said pole-pieces for positioning said shield means concentric with said rotor and for fitting over said pole-pieces and connecting said shield means to said pole-pieces in a dovetail-like connection, and bearing carrier means connected with said shield means at each end thereof for providing a bearing support for the rotor adjacent each end of said rotor shaft.

2. A miniature electric motor according to claim 1 wherein said shield means comprise a pair of semi-circular plates.

3. A miniature electric motor according to claim 1 wherein said shield means comprises a cylinder having an axial slot.

4. A miniature electric motor according to claim 1 wherein said shield means comprises a cylinder having a bottom wall at one end and an open end, and an axial slot extending from said open end along a part of said cylinder.

References Cited by the Examiner

UNITED STATES PATENTS

| | | | |
|---|---|---|---|
| 2,063,340 | 12/1936 | Ruben | 310—46 |
| 2,438,621 | 3/1948 | Schoeppel. | |
| 2,659,831 | 11/1953 | Lautner | 310—90 |
| 2,683,830 | 7/1954 | Staak | 310—40 X |
| 2,939,024 | 5/1960 | Mabuchi. | |
| 3,135,887 | 6/1964 | Schaffan. | |

FOREIGN PATENTS

| | | |
|---|---|---|
| 1,229,368 | 3/1960 | France. |

MILTON O. HIRSHFIELD, *Primary Examiner.*